Feb. 18, 1941.  H. A. SCHERUBEL  2,231,954
CASING TREATMENT
Filed May 25, 1939
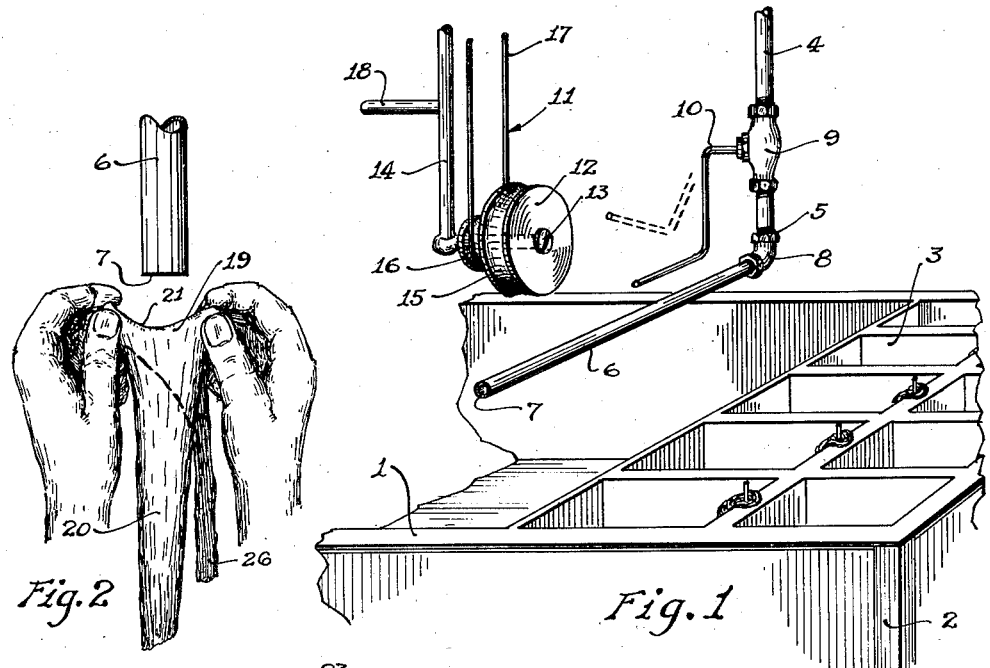
Fig. 2
Fig. 1
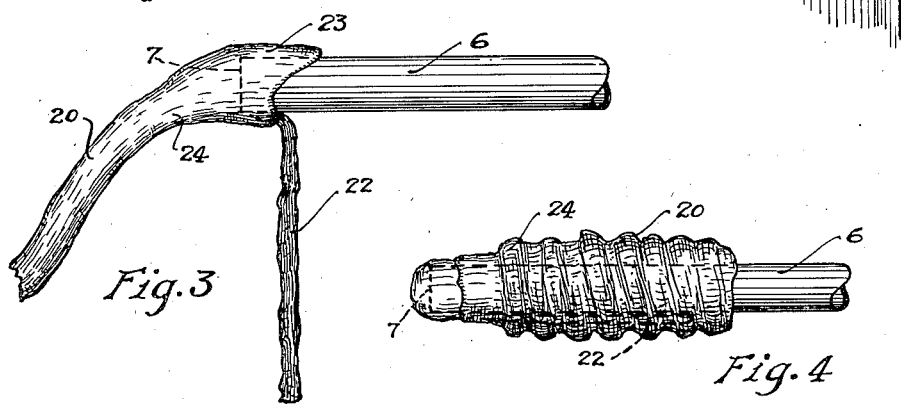
Fig. 3
Fig. 4
Fig. 5
Harry Allen Scherubel
INVENTOR
ATTEST -
Herbert E. Birch
Wm. C. Meiser
BY
ATTORNEY Patented Feb. 18, 1941

2,231,954

UNITED STATES PATENT OFFICE 2,231,954

CASING TREATMENT

Harry Allen Scherubel, Chicago, Ill., assignor to Industrial Patents Corporation, Chicago, Ill., a corporation of Delaware Application May 25, 1939, Serial No. 275,777

5 Claims. (Cl. 17—45)

This invention relates to a method of reversing tubular casings.

One of the objects of the invention is to provide a method of reversing tubular casings.

Another object of the invention is to provide a method of reversing animal intestines.

Other objects of the invention will be apparent from the description and claims which follow.

According to the present invention, one end of the casing is secured by placing the side wall spaced from one end of the casing against the open end of a tubular support and the remainder of the casing is reversed by threading it over the secured casing end and the tubular support. Thereafter, the secured end of the casing is hydraulically reversed and simultaneously removed from between the threaded casing and the tubular support.

The accompanying drawing exemplifies one form of apparatus which may be employed with the present invention.

Figure 1 is a perspective view of the apparatus.

Figure 2 shows an enlarged section of the tubular support and a casing being held by an operator preparatory to placing a side wall spaced from one end of the casing against the open end of the support.

Figure 3 shows the first step of threading the remainder of the casing upon the tubular support.

Figure 4 shows the casing threaded over the tubular support.

Figure 5 shows the reversed and removed end initially employed for securing the casing during threading of the casing.

The apparatus, more in detail, comprises a conventional casing grading table 1 mounted upon standards 2 and provided with grading troughs 3. Water line 4 extending from a source of water supply not shown, is mounted above table 1 and at its end 5 is provided with horizontal tubular support 6 open at its free end 7. Tubular support 6 communicates with line 4 through the medium of threaded L coupling 8. Valve 9 provided with control lever 10 controls the flow of water through line 4, and consequently, through tubular support 6.

Casing threader 11 comprises roller 12 rotatably mounted upon shaft 13 horizontally extended from rod 14, which extends from a source not shown. Hollowed surface 15 of roller 12, of suitable material such as cork or rubberized composition, is adapted for movement through the medium of movable rod 14, from and toward tubular support 6 for threading engagement with casings against support 6. Roller 12 is rotated by pulley 16 and belt 17 extended from a source of power not shown. Handle 18 is used by an operator for moving roller 12 toward and from tubular support 6.

Casing threaders 11, such as is shown in part in Figure 1, are well known in the art.

In practicing the method of the present invention, Figure 2 shows an operator grasping the flattened side edges 19 of casing 20 at a point 21 spaced approximately ten inches from one end 26, following which the side wall of the casing 20 is placed against the open end 7 of tubular support 6.

Figure 3 shows the next step in which the operator manually threads some four to six inches 23 of the remainder 24 of casing 20 against the end strip 22 and against the outer wall of tubular support 6 sufficiently for the casing to be engaged by roller 12.

Figure 4 shows the casing 20 following threading of the remainder 24 of the casing against the end strip 22 and the outer wall of tubular support 6. Thereafter, end strip 22 of the casing is removed from between the remainder 24 of the threaded casing and the outer wall of tubular support 6 and simultaneously is reversed, by release of water through valve 9 and consequently, open end 7 of tubular support 6.

Figure 5 shows the casing following hydraulic removal and reversal of end strip 22 from between the remainder 24 of the threaded casing and the outer wall of tubular support 6. The whole length of the casing 20 now being reversed, the casing is ready for removal from tubular support 6, which may be accomplished by manual pressure against bunched edge 25 of the casing, as shown in Figure 5.

It will be seen that in accordance with the present invention the reversal of tubular casings, such as, for example, animal intestines is greatly facilitated.

I claim:

1. The method of reversing a tubular casing comprising securing a relatively short end strip of the casing against a support, threading the remainder of the casing over the secured end strip and the support and hydraulically reversing the scured end strip.

2. The method of reversing a tubular casing which comprises securing a relatively short end strip of the casing against a tubular support, threading the remainder of the casing over the secured end strip and the tubular support and hydraulically reversing the secured end strip through the hollow of the tubular support.

3. The method of reversing a tubular casing which comprises securing the side wall a short distance from one end of the casing against the open end of a tubular support, threading the remainder of the casing over said shorter portion and said tubular support and hydraulically reversing said shorter portion.

4. The method of reversing a tubular casing which comprises securing the side wall a short distance from one end of the casing against the open end of a tubular support, threading the remainder of the casing over said short casing end strip and said tubular support and hydraulically reversing said short casing end strip through the hollow of said tubular support.

5. The method of reversing a tubular casing comprising securing the side wall a short distance from one end of the casing against the open end of a tubular support and with said casing wall flattened against the outer wall of the tubular support, threading the remainder of the casing over said end strip and said tubular support and hydraulically reversing and simultaneously withdrawing said end strip from between the threaded casing and tubular support.

HARRY ALLEN SCHERUBEL.